United States Patent Office 3,547,988
Patented Dec. 15, 1970

3,547,988
PROCESS FOR THE PREPARATION OF DIALKALI DIHYDROXYBENZENE DISULFONATES
Frederic Roland Bean, Scottsville, N.Y., assignor to Eastman Kodak Company, Rochester, N.Y., a corporation of New Jersey
No Drawing. Filed Feb. 5, 1968, Ser. No. 702,831
Int. Cl. C07c 143/42
U.S. Cl. 260—512
13 Claims

ABSTRACT OF THE DISCLOSURE

The present invention provides an improved process for the preparation and isolation of dialkali dihydroxybenzene disulfonates which consists of reacting an aqueous solution of an appropriate dihydroxybenzene disulfonic acid in admixture with relatively large quantities of "spent" sulfuric acid with an amount of an alakli metal (or ammonium) base sufficient to cause crystals of the dialkali dihydroxybenzene to precipitate from the solution while maintaining the liquid in a strongly acidic condition; the amount of base used being less than that required to raise the pH of the resulting acidic liquid above 2.

---

The present invention relates to an improved process for the manufacture of dialkali metal or ammonium dihydroxybenzene disulfonates, and more particularly, to a process involving improved precipitation methods in the manufacture of such materials.

In sulfonation processes of the type conventionally used to produce the dialkali dihydroxybenzene disulfonates such as disodium dihydroxybenzene disulfonates, the usual procedure has been to neutralize the whole reaction mixture (which includes a large amount of unreacted sulfuric acid) after the dihydroxybenzene disulfonic acid is formed (usually by reaction of the dihydroxybenzene with sulfur trioxide). The total mixture of the sulfonation products and the unreacted sulfuric acid is conventionally neutralized with an alkali metal (or ammonium) base and the diverse dialkali sulfates, alkali bisulfates, and dihydroxybenzene sulfonate salts subsequently separated by fractional crystallization or other relatively difficult means. Such methods of separating and isolating the dialkali dihydroxybenzene disulfonates from the acid neutralization products involve numerous and laborious handling steps as well as the utilization of large amounts of normally highly caustic and relatively expensive alkali bases.

It is, therefore, an object of the present invention to eliminate the numerous and laborious handling steps by isolating the dialkali product by a simple one-step precipitation which involves utilization of only the amounts of base necessary to produce the preferred and desired dialkali dihydroxybenzene disulfonate without precipitation of the bothersome and undesired (alkali) bisulfates and sulfates.

According to the present invention there is provided an improved process for preparing and isolating the desired dialkali dihydroxybenzene disulfonate products whereby an aqueous solution of an appropriate dihydroxybenzene disulfonic acid in admixture with "spent" sulfuric acid is reacted with an amount of an alkali metal (or ammonium) base sufficient to cause crystals of the dialkali dihydroxybenzene to precipitate from the solution while maintaining the liquor in a strongly acidic condition; the amount of base used being less than that required to raise the pH of the resulting acidic liquid above 2. Preferably from about ½ to about 2 moles (a stoichiometric amount) of the alkali metal (or ammonium) base are used per mole of dihydroxybenzene disulfonic acid present in the aqueous solution, thereby, surprisingly, causing relatively pure dialkali dihydroxybenzene disulfonates to precipitate from the still strongly acidic aqueous solution.

According to a preferred embodiment, the present invention provides for the reaction of an appropriate dihydroxybenzene disulfonic acid as above described with only about a stoichiometric amount (based upon the amount of dihydroxybenzene disulfonic acid present in the aqueous solution) of an alkali metal (or ammonium) base.

While the processes of this invention can be practiced successfully on any concentrated solution containing large quantities of sulfuric acid and a dihydroxybenzene disulfonic acid, it is directly applicable for treating strongly acidic liquors resulting at the end of step (a) when dialkali dihydroxybenzene disulfonates are prepared by, for example:

(a) Reacting a dihydroxybenzene selected from the group consisting of catechol, resorcinol, and hydroquinone with fuming sulfuric acid (containing excess $SO_3$) to form a dihydroxybenzene disulfonic acid product; and (b) Reacting the product of step (a) with an alkali metal (or ammonium) base, to form the corresponding dialkali dihydroxybenzene disulfonate.

According to the present invention, step (b) comprises reacting the product of step (a) with an amount of an alkali metal (or ammonium) base sufficient to cause crystals of the dialkali dihydroxybenzene disulfonate to precipitate from the solution while it is still strongly acidic, the amount of base added being less than that required to raise the pH of the resulting acidic liquor above 2.

As stated above, any of the dihydroxybenzenes are suitable for sulfonation to provide the dihydroxybenzene disulfonic acid which is subsequently reacted according to the method of the present invention. Catechol (1,2-benzenediol), resorcinol (1,3-benzenediol), and/or hydroquinone (1,4-benzenediol), may be sulfonated with very concentrated or fuming sulfuric acid according to the method described above to produce the desired disulfonic acid. Gaseous sulfur trioxide can also be used if desired.

When the above-suggested conventional method for preparing the dihydroxybenzene disulfonic acid which is one of the reagents in the processes of this invention is used, the fuming sulfuric acid which is utilized in step (a) of the process should generally contain from about 10% to about 65% free sulfur trioxide. Weaker sulfuric acid will ordinarily not produce the desired product since, as shown in the reactions set forth below, $SO_3$ must be present to obtain the desired disulfonic acid. If $SO_3$ is not present, the monosulfonic acid will be formed but not the necessary disulfonic acid. Concentrations of fuming sulfuric acid above this range may produce charring of the final product. However, very high concentrations (for example, even mixtures of $SO_3$ gas and air) can be used if desired. According to one preferred embodiment set forth in the examples below, the sulfuric acid introduced for purposes of sulfonation contains from about 25% to about 50% free sulfur trioxide. As should be clear to those skilled in the art, if a suitable catalyst can be discovered and applied to the reaction, it is conceivable that less concentrated sulfuric acid solutions may be used in the process of this invention.

The particular type of alkali metal (or ammonium) base which is added is not of crtical importance; however, certain of the alkali metal (or ammoniům) bases show definite advantages over others. For example, the alkali metal hydroxides are preferred since they react more readily with the disulfonic acids formed by reaction of the dihydroxybenzene with the sulfuric acid. Hence, sodium hydroxide, potassium hydroxide, and lithium hydroxide are specifically preferred. Ammonium hydroxide, which behaves much like sodium hydroxide, may also be utilized. Mixed bases such as monosodium-monoammonium carbonate and mixtures of bases such as a mixture of sodium and ammonium hydroxides may also be used to produce mixed sulfonates.

The anion portion of the alkali salt may also be varied. For example, such bases as sodium or ammonium carbonate or sodium bicarbonate may be utilized. However, these bases pose alternate process and manufacturing problems such as those caused by the evolution of $CO_2$ which is produced when such bases are added to the sulfonated dihydroxybenzene reaction mixture. Thus, means are preferably provided to absorb, regulate, or eliminate $CO_2$ production, when such bases are used in the methods of this invention. Again, when the anion portion of the alkali metal (or ammonium) salt is varied, the monovalent alkali salts thereof are preferred and, in particular, sodium hydroxide is further preferred as being the least costly of the preferred cation species. The ammonium salts of other bases such as ammonium carbonate may also be used. Alkali oxides also provide suitable bases for the reaction of the present invention.

The amount of the alkali base which is added is generally calculated according to the following reaction:

(1) 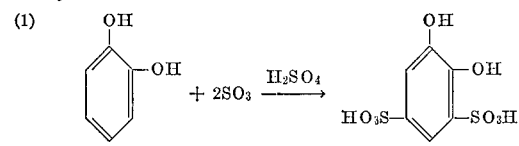

or (2)-a 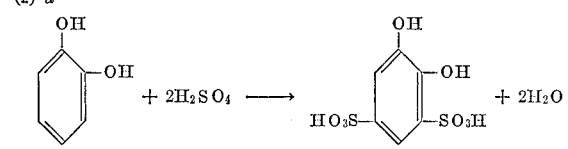

(2)-b 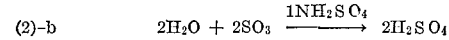

(3) Neutralization Reaction

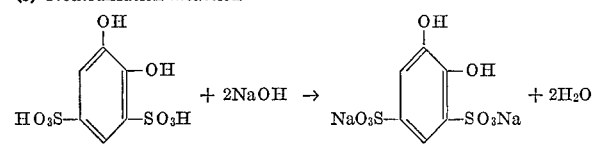

Thus, as is clear from the above reaction, although the exact mechanism of the reaction for the formation of the disulfonic acid is not certain, two moles of sodium hydroxide must generally be added to each mole of the free disulfonic acid in order to yield complete conversion of the dihydroxybenzene disulfonic acid to the corresponding dialkali dihydroxybenzene disulfonate. Surprisingly, it has been found that the alkali metal (or ammonium) bases described above attack the disulfonic acid in such a manner as to preferentially form the dialkali disulfonate initially in a one-step process and not in a two-step process which calls for conversion of all of the disulfonic acid present to the monoalkali disulfonate initially and then to the dialkali disulfonate in a subsequent and separate step as would normally be expected.

Perhaps even more surprising than the attack of the base upon the disulfonic acid to preferentially form the dialkali rather than the monoalkali disulfonate is the fact that the alkali metal (or ammonium) base attacks the disulfonic acid preferentially in the presence of an acid medium as strong as that provided in this instance by the "spent" (but nevertheless very concentrated and strongly acidic) sulfuric acid. It would be expected by the ordinarily skilled chemist that any base which might be added to a disulfonic acid-concentrated sulfuric acid solution of the type described above would initially attack at least the first of the two sulfuric acid hydrogens of that acid prior to initiating any attack upon the disulfonic acid molecule. This, surprisingly is not the case here, however, as demonstrated by the results achieved using the method of this invention.

If an excess (more than about a stoichiometric amount) of alkali metal (or ammonium) base, in the above example sodium hydroxide, is used, such excess will react with a portion of the sulfuric acid present in the reaction mixture to initially form bisulfates such as $NaHSO_4$ which may precipitate along with the preferred product in the acid medium. Of course, in order to achieve optimum results, care should be taken to add only at most about a stoichiometric amount of the alkali base, since if sufficient base is added to render the reaction mixture basic, the entire reaction mixture will be "neutralized" and the undesired alkali sulfates and bisulfates will be precipitated with the desired product. Addition of base should preferably not go beyond the point of converting all of the sulfuric acid to alkali bisulfate at which point (as discovered by pH testing of such mixtures) the aqueous mixture will have a pH of less than about 2. Thus, although the optimum results of the preferred embodiments will not be achieved when an excess (more than about a stoichiometric amount) of the alkali metal (or ammonium) base is added to neutralize the disulfonic acid, the desired product will still be obtained in substantial quantities. However, the product may be in the form of a mixture with certain of the undesirable bisulfates and sulfates which plagued prior art methods and required lengthy and complex separation steps if the excess large enough to cause formation of precipitatable amounts of such undesirable by products. Hence, depending upon the purity of the product desired, the use of such excesses of the alkali base (although permissible within the scope of this invention) may or may not be practical.

Preferably, from about ½ to about 2 moles of the sodium hydroxide or the alkali (or ammonium) base are added per mole of free sulfonic acid to preferentially form the disodium or dialkali salt which is subsequently precipitated in a substantially pure form upon bringing the reaction mixture to the proper temperature as demonstrated by the examples below:

In order to obtain optimum benefit from the apparently selective attack described above, a stoichiometric amount, or about 2 moles of the alkali (or ammonium) base should be used per mole of the disulfonic acid present in the reaction mixture.

Although the alkali base which is added to the reaction mixture may be in a solid or crystalline form, assuming the reaction has been diluted with water or is otherwise in a reactable state, it is preferred that the alkali base be added as a solution. This preference is based on a desire to more readily control the reaction which occurs when the base is added to the highly concentrated acid reaction mixture. By slow addition of a solution of the base to the reaction mixture with stirring, a considerably moderated reaction occurs. Of course rapid addition of solid alkali base may be performed if adequate safety precautions or reaction control techniques are utilized.

It is in the neutralization and precipitation of step (b) of the process for preparing the dialkali salts that the novelty and advantage of the invention are realized. It has been discovered as already mentioned above the alkali metal (or ammonium) bases attack the sulfonated dihydroxybenzene more readily than the sulfuric acid present in the reaction mixture. Hence, as the alkali metal (or ammonium) base, and preferably sodium hydroxide, reacts with the sulfonated dihydroxybenzene to yield the alkali salt of the dihydroxybenzene disulfonic acid, apparently the equilibrium of the reaction shifts and alkali cations which may immediately upon addition react with the sulfate anions of the sulfuric acid are drawn back into solution to react with the dihydroxybenzene disulfonic acid and form the dialkali salt of the sulfonated dihydroxybenzene until substantially all of the sulfonated dihydroxybenzene has been converted to the salt. It is this unexpected preferential attack of the base, and, in the preferred embodiments the sodium hydroxide, upon the dihydroxybenzene disulfonic acid (even in the presence of large amounts of strong sulfuric acid) which permits the addition of substantially stoichiometric or lesser amounts of alkali base to form the desired dialkali benzene disulfonate. Hence, there is no concurrent (and expectedly preferential) formation of the alkali sulfates or bisulfates and a neutral or basic solution which in the prior art led to a need for numerous and laborious washing, crystallizing and fractionating steps to obtain the purified desired product.

Subsequent to the addition of the alkali metal (or ammonium) base, the reaction mixture may be cooled to precipitate the desired dialkali dihydroxybenzene disulfonate. An actual cooling step may not be necessary if the reaction solutions are maintained at low enough temperatures throughout the course of the reaction or they are evaporated to substantially increase the concentration of the product in the reaction solution. According to the preferred embodiments set forth in the examples below, the cooling temperature ranges up to a maximum of about 30° C. when the concentration of the desired product ranges from about 0.25–0.75 mole per liter of reaction mixture. However, depending upon the amount of water which has been added in the preferred dilution and dissolving step and also the amount of water which may have been evaporated since addition of the alkali metal (or ammonium) base, both of which steps vary the concentration of the product in the reaction mixture, this temperature may be either higher or lower than that shown as preferred. A solution temperature of from about 0° C. to about 35° C. is generally adequate to obtain good precipitation when the product concentration is at least about 0.10 mole per liter of reaction mixture. Above and below these temperature ranges handling and processing problems arise.

The product which precipitates under these conditions is in a very high state of purity (approximately 99+%) without further refining by recrystallization.

According to the procedures for the preparation of the disulfonic acid set forth in the examples below, the reaction mixture is raised to a temperature of from about 60° to about 100° C. for a period of from about 1 to about 3 hours subsequent to addition of the catechol (or other dihydroxybenzene) to the fuming sulfuric acid. These ranges may be narrowed or widened in accordance with conventional practice providing sufficient heat is applied for a sufficient length of time to produce the required sulfonation of the dihydroxybenzene. For example, it has been found that heating at 70° C. for a period of three hours will produce the same result as heating at 90° C. for one hour.

According to the preferred embodiment, the sulfuric acid-disulfonic acid mixture may be diluted with anywhere from about 100 to about 800 cc. of water per 100 g. of sulfuric acid present prior to the addition of the alkali metal (or ammonium) base. This dilution and consequent dissolution, as mentioned above, are solely to moderate the concentration of the acid in the reaction mixture so that the reaction which occurs upon addition of the alkali base may be more readily controlled, and to provide a more suitable reaction medium prior to the addition of the alkali base to the disulfonic acid product of step (a).

As set forth in the examples below, a portion of the reaction mixture may be evaporated in order to yield the precipitate of the present invention. This evaporation is performed in order to render a reaction mixture of sufficient concentration in the dialkali dihydroxybenzene disulfonate, (at least about 0.10 mole per liter) so that when the temperature thereof is within the preferred 30° C. or less temperature range, the desired product will precipitate readily as a fine white crystalline product.

When prepared according to conventional techniques, the dihydroxybenzene disulfonic acid formed as set forth above is a semisolid mass which should be dissolved in water subsequent to formation and prior to reaction according to the process described herein. The purpose of the dilution and dissolution is to substantially reduce the concentration of the residual sulfuric acid so that the reaction which occurs upon addition of the alkali base may be controlled more readily. Also, the dihydroxybenzene disulfonic acid is not readily reactive in the semisolid state and, hence, dilution and dissolution provide a more suitable reaction medium.

As a matter of fact, insofar as the successful practice of the present invention is concerned, the particular manipulative procedures (including the concentration and types of the various reactants) utilized in producing the concentrated acidic aqueous solutions of dihydroxybenzene disulfonic acid and sulfuric acid that are neutralized via the carefully controlled methods of the present invention are not important so long as such concentrated solutions as those described herein are produced thereby.

The examples below will serve to further illustrate the process of this invention.

EXAMPLE 1

A solution of 80 grams of sodium hydroxide dissolved in 125 cc. of water is added slowly and with stirring to a sulfuric acid-dihydroxybenzene disulfonic acid solution prepared by adding 110 grams of catechol to 533 grams of 130% fuming sulfuric acid, heating the mixture at from 70° C. to 90° C. for one and a half hours, cooling to room temperature to form a semisolid mass and then dissolving the mass in 1200 cc. of water. The reaction mixture is subsequently evaporated to about 1200 cc. and then cooled slowly and with stirring to about 25° C. The product comes out as a fine white crystal which at this point in time in combination with the reaction mixture appears as a slurry. It is filtered off, the filter cake washed with alcohol, and dried. 180 grams of fine white crystalline product are obtained. This product was shown to have the elemental analysis below:

Calculated (percent): C, 22.93; H, 1.27; S, 20.38; Na, 14.65. Found (percent): C, 22.5; H, 1.6; S, 20.0; Na, 14.3.

EXAMPLE 2

A solution of 80 grams of sodium hydroxide dissolved in 130 cc. of water is added slowly and with stirring to sulfuric acid-dihydroxybenzene disulfonic acid solution prepared by adding 110 grams of catechol to 400 grams of 140% fuming sulfuric acid, warming the mixture to from 80° C. to 90° C. for about one and a half hours, cooling to room temperature to from a semisolid mass and dissolving the mass in 1200 cc. of water with vigorous stirring. The reaction mixture is evaporated to 1200 cc. and then cooled slowly and with stirring to about 30° C. The disodium dihydroxybenzene disulfonate precipitates as a fine white crystalline slurry. The product is filtered off in the filter cake and washed with alcohol. Separation by centrifugation and alcohol washing is also possible. A fine white crystalline product of excellent quality is obtained.

EXAMPLE 3

A solution of 40 grams of sodium hydroxide dissolved in 65 cc. of water is added slowly and with stirring to a sulfuric acid-dihydroxybenzene disulfonic acid solution formed adding 55 grams of catechol to 270 grams of 126% fuming sulfuric acid at room temperature, heating the reaction mixture at about 95° C. for about two and a half hours, cooling to room temperature to form a semisolid mass and dissolving the mass in about 600 cc. of water. The solution is evaporated to 600 cc. and cooled to 30° C. The product precipitates as a fine white crystalline slurry. Once again, a fine white crystalline product of excellent quality is obtained when the precipitate is filtered off and washed with alcohol.

EXAMPLE 4

A solution of 20 grams of sodium hydroxide dissolved in 125 cc. of water is added to a sulfuric acid-dihydroxybenzene disulfonic acid mixture prepared adding 55 grams of catechol to 267 grams of 130% fuming sulfuric acid, warming to from about 70 to about 90° C. for one and one quarter hours, cooling to room temperature and dissolving the semisolid mass thus formed in 600 cc. of water. The amount of sodium hydroxide added is only enough to neutralize one of the disulfonic acid hydrogens. The mixture is then evaporated to a total volume of about 600 cc. and cooled to about 20° C. 54 grams of the product are obtained. The infrared curve of the product matches closely that obtained from analysis of a standard product.

The invention has been described in detail with particular reference to a preferred embodiment thereof, but it will be understood that variations and modifications can be effected within the spirit and scope of the invention as described hereinabove and as set forth in the appended claims.

I claim:
1. In a process for manufacturing a dialkali dihydroxybenzene disulfonate, which process comprises the step of reacting together:
   (a) a strongly acidic aqueous solution having a pH of less than about 2 comprising a mixture of a dihydroxybenzene disulfonic acid and sulfuric acid with
   (b) a base selected from the group consisting of alkali metal and ammonium bases; the improvement which comprises utilizing an amount of said base sufficient to cause crystals of said dialkali dihydroxybenzene disulfonate to precipitate from said strongly acidic aqueous solution; said amount of said base being less than that required to raise the pH of the resulting acidic aqueous solution above 2.

2. A process as in claim 1 wherein at most about 2 moles of said base are utilized per mole of said dihydroxybenzene disulfonic acid.

3. A process as in claim 2 wherein at least about ½ mole of said base is utilized per mole of said dihydroxybenzene disulfonic acid.

4. A process as in claim 2 wherein a recovery step is added subsequent to said reaction of (a) and (b), said recovery step comprising separating said crystals of said dialkali metal dihydroxybenzene disulfonate from said acidic liquor.

5. A process as in claim 2 wherein said dihydroxybenzene disulfonic acid is selected from the group consisting of 1,2-dihydroxybenzene-3,5-disulfonic acid, 1,3-dihydroxybenzene-5,6-disulfonic acid, and 1,4-dihydroxybenzene-2,5-disulfonic acid.

6. A process as in claim 4 wherein about a stoichiometric amount of said base is utilized.

7. A process as in claim 5 wherein said alkali metal base is selected from the group consisting of alkali metal carbonates, alkali metal hydroxides, and alkali metal oxides.

8. A process as in claim 6 wherein said alkali metal base is sodium hydroxide.

9. A process as in claim 4 wherein said alkali metal base is selected from the group consisting of alkali metal carbonates, alkali metal bicarbonates, alkali metal hydroxides, and alkali metal oxides.

10. A process as in claim 8 wherein said alkali metal base is selected from the group consisting of sodium, potassium, and lithium bases.

11. A process as in claim 9 wherein said alkali metal base is sodium hydroxide.

12. A process as in claim 9 wherein said dihydroxybenzene disulfonic acid is 1,2-dihydroxybenzene-3,5-disulfonic acid and the temperature of said acidic liquor is between about 0° C. and about 30° C. during said recovery step.

13. A process as in claim 10 wherein said acidic liquor contains from about 0.25 to about 0.75 mole per liter of said dialkali dihydroxybenzene disulfonate prior to said recovery step.

References Cited
UNITED STATES PATENTS 607,494  7/1898  Tobias _____ 260—512

FOREIGN PATENTS 69,765  6/1914  Switzerland _____ 260—512

DANIEL D. HORWITZ, Primary Examiner